Oct. 5, 1965     S. E. FISHER     3,209,726

ANIMAL SHOES

Filed Aug. 19, 1963

INVENTOR:

Simpson E Fisher

United States Patent Office 3,209,726
Patented Oct. 5, 1965

3,209,726
ANIMAL SHOES
Stanton E. Fisher, 3960 Olive St., St. Louis, Mo.
Filed Aug. 19, 1963, Ser. No. 302,932
1 Claim. (Cl. 119—1)

This invention relates to animal shoes or boots. More particularly this invention relates to animal shoes or boots prepared from a unitary piece of material, such as leather, plastic, etc. having holes therein which can be laced into a suitable covering for the feet of animals.

The advantages of this invention will become apparent from the description herein given and by reference to the attached drawings in which.

Under certain conditions it is desirable to protect the feet of animals such as dogs against the hazards of tough, sharp or dangerous terrain, inclement weather, etc.

I have now devised animal shoes for animals such as dogs, etc. which are suitable for this purpose. These shoes are of simple design and construction, which are both decorative and practical.

They are of a one piece or unitized construction whose configuration includes all component areas of foot enclosure. They contain no stitches, rivets or other easily broken or chewed fastening devices.

In essence the shoes are prepared from a unitary piece of material such as leather, plastic, which may be made waterproof, if desired. They have holes punched in suitable positions thereon, and are laced by any suitable lacing means, for example of plastic, leather, cotton, nylon, etc. lacing material into the configuration of a shoe. The lace may be separate or actually made part of the shoe. These shoes are capable of a wide range of adjustments to suit the animal. They may be made reversible (i.e. either side may be worn on the outside) if so desired.

Figure 1:
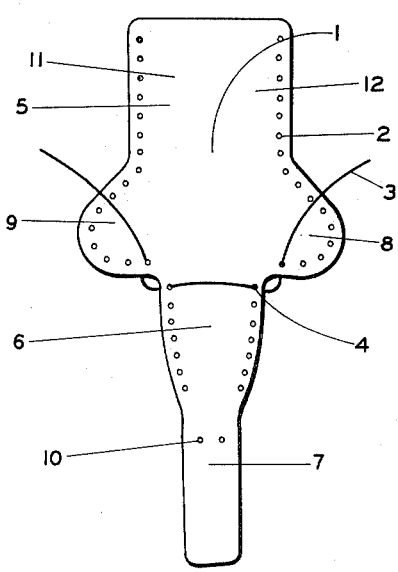
FIGURE 1 is a view of the unitary piece of material laid flat.

FIGURE 1—a precut unitary piece of material for the shoe 1 which may be any suitable material such as leather, plastic, etc. is prepared and holes 2 are punched in appropriate positions so that when assembled with a lace 3 a suitable animal shoe is produced. The lace is inserted at the junction 4 of the upper part 5 of the shoe and sole 6 of the shoe and lacing is commenced at this position as shown in FIGURE 1.

Figure 2:
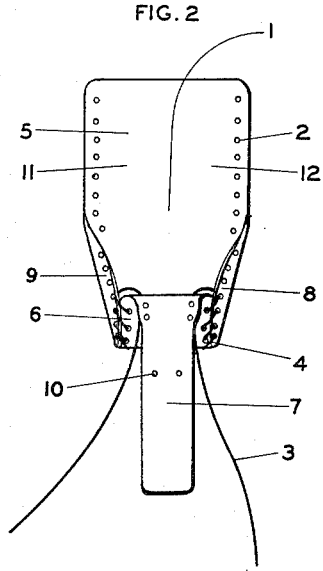
FIGURE 2 is a view of the shoe in the initial stages of lacing.

Lacing is continued as shown in FIGURE 2 so as to unite the sole 6 of the shoe with the sides 8 and 9 of shoe.

Figure 3:
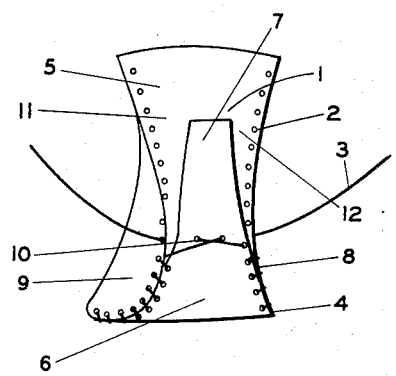
FIGURE 3 is a view of the shoe in an intermediate stage in lacing.

Lacing is further continued as shown in FIGURE 3 until all of the holes on the sole 6 have been laced. The tongue 7 is drawn up and lacing is continued through the upmost pair of holes 10 on the tongue 7.

Figure 4:
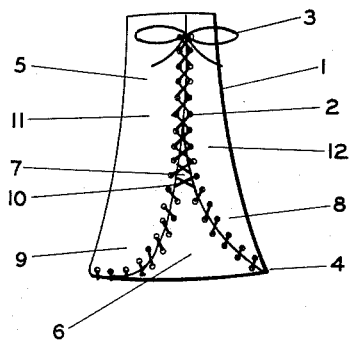
FIGURE 4 is a view of the completely laced shoes ready to be worn by the animal.

Lacing is continued through the holes on the upper parts 11 and 12 of the shoe. When the entire shoe is laced it appears as shown in FIGURE 4. The animal foot is inserted therein and the laces are drawn to the desired tightness so that the animal's foot fits snugly therein.

Alternatively the shoe can be only partially laced to the top, for example 2, 3 or 4 holes down from the top of the upper section of the shoes 11 and 12 and the top material of the shoe may be folded over to form the top collar. By proper adjustments of laces the shoe can be fitted to the foot of the dog.

While I have illustrated one practical mode of carrying out my invention, it will be understood that such changes and modifications may be resorted to as come within the spirit and scope of the claim.

Having thus described my invention what I claim as new and desire to obtain by Letters Patent is:

An animal shoe of a unitary piece of material comprising, in combination, upper sections, side sections, a sole section and a tongue section, and means for simultaneously uniting said sections and conforming said sections about and to, respectively, the animal's foot, said means being a lace, whereby said shoe is properly fitted to the animal's foot without requiring any stitches, rivets and other easily broken or chewable fastening devices.

References Cited by the Examiner

UNITED STATES PATENTS 2,443,831  6/48  Miller _____ 54—79
2,651,853  9/53  Lewis _____ 36—2.5

FOREIGN PATENTS 166,601  6/56  Australia.

SAMUEL KOREN, Primary Examiner.
HUGH R. CHAMBLEE, Examiner.